S. J. DIBBINS.
FRICTION CONTROLLING DEVICE.
APPLICATION FILED DEC. 12, 1908.
926,392.
Patented June 29, 1909.
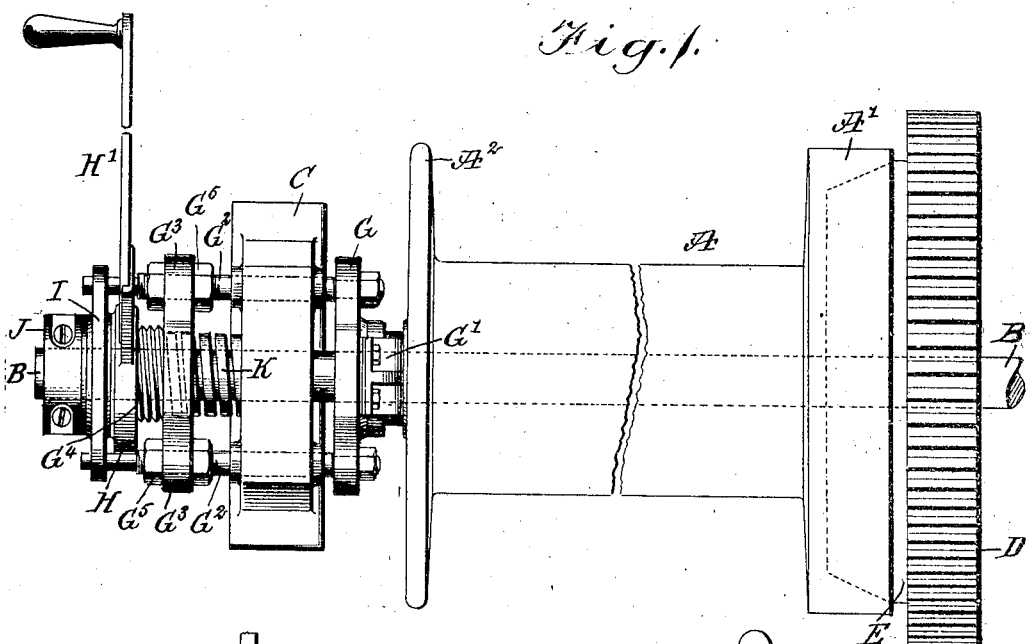
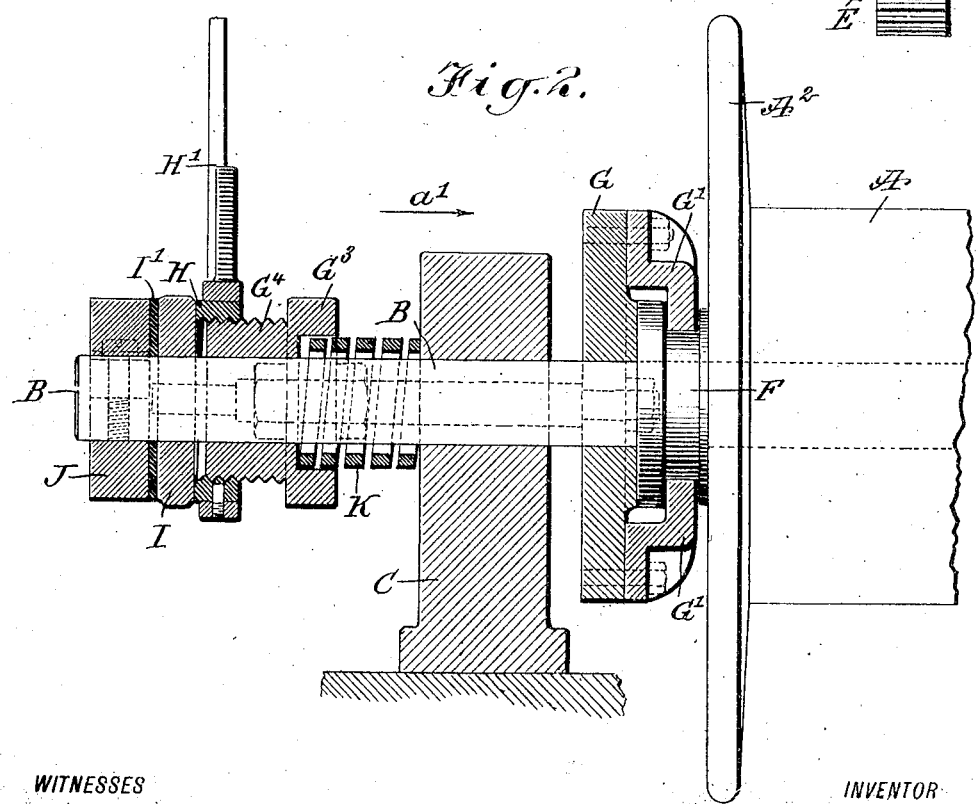
WITNESSES
INVENTOR
Sylvester J. Dibbins
BY
ATTORNEYS

UNITED STATES PATENT OFFICE.

SYLVESTER J. DIBBINS, OF NEW YORK, N. Y.

FRICTION-CONTROLLING DEVICE.

No. 926,392.   Specification of Letters Patent.   Patented June 29, 1909.

Application filed December 12, 1908. Serial No. 467,196.

*To all whom it may concern:*

Be it known that I, SYLVESTER J. DIBBINS, a citizen of the United States, and a resident of the city of New York, borough of Brooklyn, in the county of Kings and State of New York, have invented a new and Improved Friction-Controlling Device, of which the following is a full, clear, and exact description.

The invention relates to the friction clutches of hoisting drums, and its object is to provide a new and improved friction-controlling device arranged to insure an easy working of the friction clutch, to reduce the friction of the working parts to a minimum and to avoid weakening of the drum shaft. To attain these ends use is made of a device external of the drum shaft, and having a spring-pressed pressure device engaging a grooved collar on the movable clutch member, and a manually-controlled pressure nut screwing on a pressure screw on the said pressure device.

A practical embodiment of the invention is represented in the accompanying drawings forming a part of this specification, in which similar characters of reference indicate corresponding parts in both views.

Figure 1 is a plan view of the improvement; and Fig. 2 is an enlarged sectional side elevation of the same.

The drum A is mounted to turn loosely and to slide axially on the shaft B journaled in bearings C, and on the said shaft B is secured a driving wheel D adapted to be connected by the usual friction blocks E with the friction clutch member A' at one end of the drum A, to rotate the latter with the driving wheel D. The drum A forms the movable member of the friction clutch and is moved axially by the friction controlled device presently to be described in detail.

On the outer end A² of the drum A is secured or formed a grooved collar F, engaged by the draw-off brackets G' attached to the pressure plate G, mounted to slide loosely on the shaft B, and provided with pressure rods G² fitted to move parallel with the shaft B, and mounted to slide in the bearing C, as plainly indicated in Fig. 1. On the said rods G² is secured a cross head G³ provided with a pressure screw G⁴, through which passes loosely the shaft B and on which screws a pressure nut H having a handle H' under the control of the operator. The outer face of the pressure nut H abuts against a thrust washer I held against a loose washer I' on the inner face of a thrust collar J keyed or otherwise secured to the outer end of the shaft B. A spring K is coiled on the shaft B and rests with one end on the outer face of the bearing C and with its other end fits into a recess in the cross head G³, to force the pressure plate G by means of the pressure rods G² and with it the drum A (by means of the draw-off brackets G') into a left-hand position, to disconnect the drum from the driving wheel D, as indicated in Fig. 1.

The operation is as follows: When the several parts are in the position as shown in the drawings, the drum A is disengaged from the friction blocks E, and when it is desired to throw the drum A into action then the operator swings the handle H' of the pressure nut H over, so as to unscrew the pressure nut H on the pressure screw G⁴ of the cross head G³, thus forcing the pressure plate G in the direction of the arrow a' against the tension of the spring K, and this movement causes a movement of the drum A in the direction of the arrow a', to connect the drum A by the friction clutch with the driving wheel D for the latter to rotate the drum A. When the operator throws the handle H' of the pressure nut H in the reverse direction then the pressure screw G⁴ is caused to move in the inverse direction of the arrow a', whereby the drum A is moved from the right to the left, that is, drawn out of frictional engagement with the driving wheel D. By the arrangement described the several parts are located wholly externally of the shaft B, and hence the latter is not weakened in any degree by drilling or slotting for friction pin, cross key or the like.

The cross head G³ and its pressure screw G⁴ are held adjustably on the rods G² by nuts G⁵, to allow adjustment of said cross head G³, the parts connected therewith and the drum A, to shift the latter relative to the friction blocks E and compensate for the wear of the said friction blocks. The washer I is preferably guided loosely on the outer terminals of the rods G² so as to hold the pressure washer I against turning. The washer I' is inserted to reduce friction between the thrust collar J and the pressure washer I.

As the several parts are wholly external of the shaft B convenient access is had to the same for adjustment, repairs or other causes, and the friction-controlling device can be readily actuated and the movable member of the clutch can be moved with more or less force into contact with the driven member of the clutch by the operator moving the handle H' correspondingly, to turn the pressure nut H more or less on the pressure screw G⁴.

Having thus described my invention, I claim as new and desire to secure by Letters Patent:

1. A friction-controlling device for the movable member of a friction clutch, comprising a grooved collar on the said movable clutch member, a pressure plate having draw-off-brackets engaging the said collar, rods attached to the said pressure plate, a cross head adjustably secured on the said rods and having a pressure screw, a spring pressing the said cross head, a pressure nut having a handle and screwing on the said pressure screw, a thrust washer for the said pressure nut, and a thrust collar secured on the drum shaft and engaged by the said thrust washer.

2. A friction controlling device for the movable member of the friction clutch, comprising a pressure plate having a rotatable engagement with the movable clutch member, rods attached to the said pressure plate, a cross head adjustably secured on the said rods and having a pressure screw, a spring pressing the said cross head, a pressure nut having a handle and screwing on the said pressure screw, a thrust washer for the said pressure nut, and a thrust collar secured on the drum shaft and engaged by the thrust washer.

3. A friction controlling device for the movable member of a friction clutch comprising a pressure plate having a rotatable engagement with the movable clutch member, a crosshead provided with a pressure screw, rods attached to the pressure plate and upon which the cross head is adjustable, means engaging the pressure screw for moving the crosshead in one direction, a spring for moving it in the opposite direction, and a connection between the pressure plate and the drum shaft.

In testimony whereof I have signed my name to this specification in the presence of two subscribing witnesses.

SYLVESTER J. DIBBINS.

Witnesses:
   THEO. G. HOSTER,
   THOMAS H. DIBBINS.